US010313142B2

(12) United States Patent
Santos et al.

(10) Patent No.: US 10,313,142 B2
(45) Date of Patent: Jun. 4, 2019

(54) PROCESS FOR PROVIDING NETWORK ACCESS FOR A USER VIA A NETWORK PROVIDER TO A SERVICE PROVIDER

(75) Inventors: Hugo Santos, Heidelberg (DE); Joao Girao, Ludwigshafen (DE)

(73) Assignee: NEC CORPORATION, Tokyo (JP)

( * ) Notice: Subject to any disclaimer, the term of this patent is extended or adjusted under 35 U.S.C. 154(b) by 1287 days.

(21) Appl. No.: 13/061,165

(22) PCT Filed: Jul. 22, 2009

(86) PCT No.: PCT/EP2009/005329
§ 371 (c)(1),
(2), (4) Date: May 17, 2011

(87) PCT Pub. No.: WO2010/022826
PCT Pub. Date: Mar. 4, 2010

(65) Prior Publication Data
US 2011/0213688 A1    Sep. 1, 2011

(30) Foreign Application Priority Data
Aug. 29, 2008    (EP) ..................................... 08015346

(51) Int. Cl.
*H04L 12/14*    (2006.01)
*G06Q 30/04*    (2012.01)
(Continued)

(52) U.S. Cl.
CPC ......... *H04L 12/1403* (2013.01); *G06Q 30/04* (2013.01); *H04L 12/14* (2013.01);
(Continued)

(58) Field of Classification Search
None
See application file for complete search history.

(56) References Cited

U.S. PATENT DOCUMENTS 6,266,401 B1    7/2001    Marchbanks et al.
6,721,554 B2    4/2004    Gnesda et al.
(Continued)

FOREIGN PATENT DOCUMENTS

EP    1469633 A1 *    10/2004    ............ H04L 12/14
JP    H11296583 A    10/1999
(Continued)

OTHER PUBLICATIONS

Lopez, Gabriel et al., Use of XACML Policies for a Network Access Control Service, IOS Press 2003, http://dame.inf.um.es/files/NAS-SAML_Policies.pdf.*
(Continued)

*Primary Examiner* — Scott A Zare
(74) *Attorney, Agent, or Firm* — Young & Thompson

(57) ABSTRACT

For providing a simple network access process which can be used for accessing network with focus on a single service a process for providing network access for a user via a Network Provider (NP) to a Service Provider (SP) is claimed, the process including: establishing a connection between the user and the Network Provider (NP) by user's request to access the Service Provider (SP); authenticating of the user by a user's Identity Provider (IdP) on request of the Network Provider (NP); transmitting data from the Identity Provider (IdP) to the Network Provider (NP), so that the Network Provider (NP) has the information that the Service Provider (SP) or a third party is payee of the access fees; and providing the access for the user via the Network Provider (NP) to the Service Provider (SP) by the Network Provider (NP).

15 Claims, 8 Drawing Sheets

Figure 1:
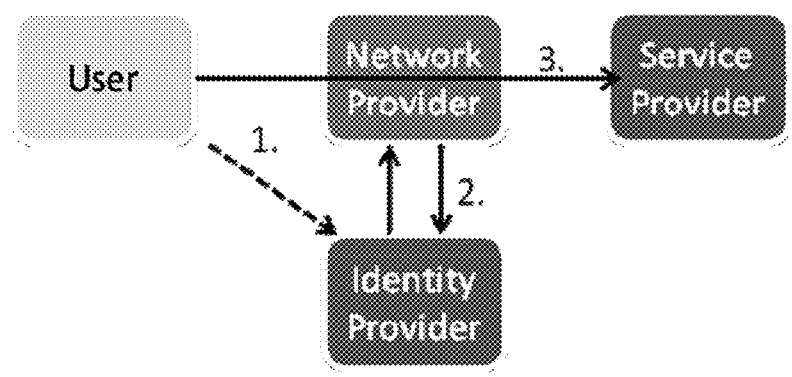

(51) Int. Cl.
*H04L 29/06* (2006.01)
*H04W 12/08* (2009.01)
*H04W 84/12* (2009.01)

(52) U.S. Cl.
CPC ...... *H04L 12/1471* (2013.01); *H04L 63/0815* (2013.01); *H04L 63/10* (2013.01); *H04W 12/08* (2013.01); *H04W 84/12* (2013.01)

(56) References Cited

U.S. PATENT DOCUMENTS

| | | | |
|---|---|---|---|
| 6,862,444 | B2 | 3/2005 | Karaoguz et al. |
| 9,232,338 | B1 * | 1/2016 | Henry ................. H04W 4/021 |
| 2004/0152447 | A1 | 8/2004 | McDonnell et al. |
| 2004/0203602 | A1 | 10/2004 | Karaoguz et al. |
| 2005/0055371 | A1 * | 3/2005 | Sunder .................... H04L 29/06 |
| 2005/0210288 | A1 * | 9/2005 | Grosse .......................... 713/201 |
| 2008/0046963 | A1 | 2/2008 | Grayson et al. |

FOREIGN PATENT DOCUMENTS

| | | | | |
|---|---|---|---|---|
| JP | 2002132727 | A | 5/2002 | |
| JP | 2004258872 | A | 9/2004 | |
| JP | 2004355073 | A | 12/2004 | |
| JP | 2007048241 | A | 2/2007 | |
| WO | WO-2007000181 | A1 * | 1/2007 | ............. H04L 12/14 |

OTHER PUBLICATIONS www.w3c.org/P3P, Platform for Privacy Preferences, last edition was sugmitted in 2007 (only the first 10 pages were attached since this is a particularly long document and can easily be accessed via the internet).*

Common Open Policy Service Tools, COPS, http://tools/ietf.org/html/rfc2748, published 2000.*

International Search Report, dated Jan. 19, 2010, from corresponding PCT application.

Mikael Linden et al., "Roaming Network Access Using Shibboleth", Terena Networking Conference, 2004, retrieved from the Internet: URL: http://www.terena.org/publications/tnc2004-proceddings/papers/linden.pdf; Cited in International Search Report.

Wolfgang Hommel, "Using XACML for Privacy Control in SAML-Based Identity Federations", Communications and Multimedia Security Lecture Notes in Computer Science, Jan. 1, 2005, pp. 160-169; vol. 3677; Cited in International Search Report.

U.M. Mbanaso et al., "Obligations for Privacy and Confidentiality in Distributed Transactions", Emerging Directions in Embedded and Ubiquitous Computing, Dec. 1, 2007, pp. 69-81, vol. 4809; Cited in International Search Report.

Ana Sanz Merino et al., "Secure Authentication System for Public WLAN Roaming", Mobile Networks and Applications, Jun. 1, 2005, pp. 355-370, vol. 10, No. 3; Cited in International Search Report.

Gabriel Lopez et al., "A Network Access Control Approach based on the AAA Architecture and Authorization Attributes", Parallel and Distributed Processing Symposium, 2005; Cited in International Search Report.

Translation of Japanese Office Action, dated Feb. 14, 2013, from corresponding JP application.

* cited by examiner

```
<POLICIES>
  <POLICY>
    <ENTITY>
      <DATA-GROUP>
        <DATA ref="#business.name">
          Network Provider
        </DATA>
        ...
      </DATA-GROUP>
    </ENTITY>
    <ACCESS><nonident/></ACCESS>
    <STATEMENT>
      <CONSEQUENCE>Payment for Network Access.</CONSEQUENCE>
      <PURPOSE><admin/></PURPOSE>
      <RECIPIENT><ours/></RECIPIENT>
      <RETENTION><indefinitely/></RETENTION>
      <DATA-GROUP>
        <DATA ref="#sba.payment.one-time.amount">3</DATA>
        <DATA ref="#sba.payment.one-time.currency">EUR</DATA>
        <DATA ref="#sba.payment.rate.amount">0.05</DATA>
        <DATA ref="#sba.payment.rate.currency">EUR</DATA>
        <DATA ref="#sba.payment.metric">per 50MB</DATA>
        <DATA ref="#sba.filter"> http://[SP]/* </DATA>
      </DATA-GROUP>
    </STATEMENT>
  </POLICY>
</POLICIES>
```

Fig. 4

```
<POLICIES>
  <POLICY>
    <ENTITY>
      <DATA-GROUP>
        <DATA ref="#business.name">
          Service Provider
        </DATA>
        <DATA ref="#finantial.entity">
          <Endpoint Binding="SAML">
            http://sp.com/SAMLAttributeProvider
          </Endpoint>
        </DATA>
        <DATA ref="#sba.filter"> http://sp.com/restricted/* </DATA>
        <DATA ref="#sba.filter"> http://sp.com/login/* </DATA>
        ...
      </DATA-GROUP>
    </ENTITY>
    <ACCESS><nonident/></ACCESS>
    <STATEMENT />
  </POLICY>
</POLICIES>
```

Fig. 5

```xml
<Obligations>
  <Obligation
      ObligationId="eu:neclab:nw:sba:obligation"
      FulfillOn="Permit">
      <AttributeAssignment
          AttributeId="eu:neclab:nw:sba:obligation:subject"
          DataType="urn:oasis:names:tc:SAML:2.0:assertion:NameID">
          <saml:NameID
              xmlns:saml="urn:oasis:names:tc:SAML:2.0:assertion"
              Format="http://www.w3.org/2001/XMLSchema#anyURI">
              temporary-subject@sp.com
          </saml:NameID>
      </AttributeAssignment>
      <AttributeAssignment
              AttributeId="eu:neclab:nw:sba:obligation:negotiation:endpoint"
              DataType="urn:oasis:names:tc:SAML:2.0:metadata:Endpoint">
              <md:NegotiationService
      xmlns:md="urn:oasis:names:tc:SAML:2.0:metadata:Endpoint"
                  Binding="SOAP">
                  https://idp.com:8444/SAMLNegotiation
              </md:NegotiationService>
      </AttributeAssignment>
      <AttributeAssignment
              AttributeId="eu:neclab:nw:sba:obligation:negotiation:payment:one-time:amount"
              DataType="http://www.w3.org/2001/XMLSchema#integer">
              10
      </AttributeAssignment>
      <AttributeAssignment
              AttributeId="eu:neclab:nw:sba:obligation:negotiation:payment:one-time:currency"
              DataType="http://www.w3.org/2001/XMLSchema#string">
              EUR
      </AttributeAssignment>
      <AttributeAssignment
      AttributeId="eu:neclab:nw:sba:obligation:negotiation:payment:rate:amount"
              DataType="http://www.w3.org/2001/XMLSchema#double">
              0.1
      </AttributeAssignment>
      <AttributeAssignment
      AttributeId="eu:neclab:nw:sba:obligation:negotiation:payment:rate:currency"
              DataType="http://www.w3.org/2001/XMLSchema#string">
              EUR
      </AttributeAssignment>
      <AttributeAssignment
          AttributeId="eu:neclab:nw:sba:obligation:negotiation:payment:metric"
          DataType="eu:neclab:nw:sba:obligation:negotiation:payment:metric:type">
              perHour
      </AttributeAssignment>
      AttributeAssignment
              AttributeId="eu:neclab:nw:sba:obligation:negotiation:payment:method"
              DataType="eu:neclab:nw:sba:obligation:negotiation:payment:method:type">
              VISA
      </AttributeAssignment>
      <AttributeAssignment
              AttributeId="eu:neclab:nw:sba:obligation:negotiation:payment:data"
              DataType="http://www.w3.org/2001/XMLSchema#string">
              1111 2222 3333 4444, 20/2010, 123
      </AttributeAssignment>
      <AttributeAssignment
              AttributeId="eu:neclab:nw:sba:obligation:filter"
              DataType="http://www.w3.org/2001/XMLSchema#anyURI">
              http://sp.com/restricted/*
      </AttributeAssignment>
      <AttributeAssignment
              AttributeId="eu:neclab:nw:sba:obligation:filter"
              DataType="http://www.w3.org/2001/XMLSchema#anyURI">
              http://sp.com/login/*
      </AttributeAssignment>
  </Obligation>
</Obligations>
```

Fig. 6

PROCESS FOR PROVIDING NETWORK ACCESS FOR A USER VIA A NETWORK PROVIDER TO A SERVICE PROVIDER

BACKGROUND OF THE INVENTION

Field of the Invention

The present invention relates to a process for providing network access for a user via a Network Provider (NP) to a Service Provider (SP) according to claim 1.

Description of the Related Art

Currently, network access is treated as a service by itself. In order to access a Service Provider (SP) the user needs to establish a session with a Network Provider (NP) and provide sufficient information or required billing data for the access to be charged. U.S. Pat. No. 6,862,444 B2 is showing billing performed in current deployments. In current wifi hot-spots deployments, for example, this session is established through authentication to the NP, usually through a portal that is presented to the user when he first tries to access any external webpage. The NP also maintains the billing information required for charging the user, data that was provided when the account was created during the user's first access. This billing information could either be the subscription information of a pre-existing contract between the user and the NP (e.g. operator model) or banking information to be charged, such as credit card number of account number.

Users access hot-spots to either consume multiple services, which can be described as the typical Internet model, or to focus on a single service, such as accessing the company VPN, performing the online check-in, looking for directions/maps, buying a book, checking e-mail, etc. The focus of this work is the latter case, where a single service is accessed. Existing deployments favor the Internet model, where users don't see the creating of an account and supplying of billing information as a major burden. However, this procedure is not practical when the user is accessing a single service, especially considering that most times, when users do so, they are on the go, travelling, and using limited internet devices, such as smart phones.

The last mentioned current trends have users contact single services for small amounts of data in a very nomadic fashion, such as checking for new emails or directions in a maps service, searching for nearby restaurants or just automatic context updates (i.e. "I'm now in the street"). In these cases, and using a hotspot service, the user will be required to provide personal information twice, to authenticate to the Network Provider as well as to the target Service Provider. Additionally, he will have to share delicate personal information, for instance his credit card number, with what could be a potentially unknown party, the NP. Both these points are common detractors for users; they will often refrain from contacting the Service Provider.

Thus, the technical background of the present invention can be summarized as follows:
Recent trends:
   free the user from responsabilities of setting up access
   keep it simple: press one button, get service
   mash up many services to enhance your own
   some services are sporadic and very specific in nature
     e.g. 'find close by restaurants', 'navigate to street', 'book cinema'

Reality:
   the user still needs to get access on his own
     complicated hotspot access procedures
     always-on UMTS unsuitable for high bandwidth/low latency service demands
     agreements between providers are often required for service aggregation, and are often not available
     users establish generic connections to the Internet, independent of the service they wish to access From U.S. Pat. No. 6,721,554 B2 is known a method and apparatus for policy-based charging for telecommunication services. This document describes how calls may be billed based on measured quality of service level and pre-specified SLAs.

U.S. Pat. No. 6,266,401 B1 is showing a consolidated billing system and method for use in telephony networks. This document describes how billing regarding multiple services, such as calling, voicemail, etc. may be aggregated into a common user billing.

US 2004/0152447 A1 is showing a method and apparatus for authenticating service to a wireless communications device. Specifically of interest within this document is how local context, in this case the actual hotspot being used, is a variable in the decision of a remote entity.

US 2005/0210288 A1 is showing a method and apparatus for eliminating dual authentication for enterprise access via wireless LAN services. The method allows single authentication to be performed using a user's enterprise-specific credentials. This method however requires agreements to be performed between network provider and enterprises to offer limited access to enterprise VPN servers.

US 2004/0203602 A1 is describing enabling and controlling access to wireless hotspots. In this context traditional authentication expects personal data to be exchanged between wireless user and the network provider.

SUMMARY OF THE INVENTION

It is an object of the present invention to improve and further develop a process for providing network access for providing a simple network access process which can be used for accessing network with the focus on a single service.

In accordance with the invention, the aforementioned object is accomplished by a method comprising:
   establishing a connection between the user and the Network Provider (NP) by user's request to access the Service Provider (SP);
   authenticating of the user by a user's Identity Provider (IdP) on request of the Network Provider (NP);
   transmitting data from the Identity Provider (IdP) to the Network Provider (NP), so that the Network Provider (NP) has the information that the Service Provider (SP) or a third party is payor of the access fees; and
   providing the access for the user via the Network Provider (NP) to the Service Provider (SP) by the Network Provider (NP).

According to the invention it has been recognized that a very simple network access process is comprising mechanisms that would allow a Network Provider to charge the access fees to a third party established by the user's identity provider. The present invention is comprising the feature that the Service Provider or a third party can support the access fees of some or all of its clients, reducing the usability burden faced by users and thus increasing its own business and creating new revenues streams for existing Network Providers. The fact that the Service Provider or a third party is payor of the access fees makes network access very simple, as a user does not have to be subscriber of the Network Provider.

Preferably, said process is further comprising charging the access fees to the payor by the Network Provider (NP). In this regard, it is possible that said process is further comprising producing an obligation containing billing information by the Network Provider (NP). Preferably, the policy decision technology which results in the obligation is the XACML technology. In any case the usual usability barriers are reduced and users have fewer concerns accessing the network since they are not providing their personal data directly to the Network Provider.

In a very simple case the Identity Provider (IdP) could be the Service Provider (SP).

Advantageously, during the authenticating step the Network Provider (NP) is asking the user to specify his Identity Provider (IdP). In this regard the Network Provider (NP) could redirect the user to a page where he can specify his Identity Provider (IdP). During this step the user is authenticating towards the Identity Provider (IdP).

Preferably, the data being transmitted from the Identity Provider (IdP) to the Network Provider (NP) are based on the context built by the Network Provider (NP), the user's policies and/or the identity of the Service Provider (SP) being accessed. For selecting the payor the Network Provider (NP) and the Identity Provider (IdP) could negotiate under consideration of the context, the user's policies and/or the identity of the Service Provider (SP) being accessed. In other words, the payor could be selected based on context and/or user's policies.

After the authentication step the Identity Provider (IdP) is preferably redirecting the user to the Network Provider (NP).

With regard to access control to service access it is preferred that the Network Provider (NP) will construct a policy decision request, acting as a Policy Enforcement Point (PEP), and contact the Identity Provider (IdP) which will act as a Policy Decision Point (PDP). This request could contain context information which will allow the PDP to reach a decision.

Advantageously, the Network Provider (NP) is further negotiating and/or verifying billing obligations or information provided by the Identity Provider (IdP) with the payor. During said negotiation and/or verifying step payment and/or service access options could be fine-tuned. This step is very much dependent on the payor and the Network Provider (NP) and there are many different possibilities on how to achieve it.

With respect to efficient conditions negotiations the Network Provider (NP) and the payor or Service Provider (SP) both are providing their boundaries for service provisioning in terms of P3P policies. These policies are usually used to convey how user data will be manipulated but their use can be extended to determine service level parameters. Another reason for choosing P3P is that since this policy is meant to be public, it will also discourage misbehaving Network Providers (NP) and Service Providers (SP). In other words, the P3P policies can be used to determine service level parameters and/or to negotiate access conditions.

Further, with respect to efficient and simple network access it may be provided that the payor or Service Provider (SP) focuses on filters and billing information and the Network Provider (NP) on the payment. The degree of focusing on filters and billing information and on the payment is depending on the individual application.

Furthermore, other personal or individual information about the user may be offered to the Network Provider (NP) and/or Service Provider (SP) to enhance personalization and/or to provide information required by the Service Provider (SP) or Network Provider (NP).

With respect to a very simple network access the Network Provider (NP) may provide a WLAN for network access.

The present invention is providing the mechanisms that would allow a Network Provider (NP) to charge the access fees to a third party established by the user's Identity Provider (IdP). This decision may be performed based on context and user policies, but it can be expected, that in most cases the Service Provider (SP) itself will be the party supporting the cost. This capability is made available by augmenting the interactions between the Network provider and the Identity Provider through Identity Management protocols, allowing an Identity Broker (IdB) to establish billing obligations that the Network Provider can further negotiate and verify with the Service Provider, and will ultimately use to charge the network access. In principle, these mechanisms can also be used to offer other information to the NP or SP about the user to enhance personalization, offer context information required by the SP or NP, etc.

Preferred aspects of the invention are:
network provider can bill service provider on services access during user authentication
user can select privacy policies on access control protocol
network provider and service provider can negotiate conditions for network access independent of the identity management system
based on new business model This work takes into consideration that most times, the user is already a client of the Service Provider he is accessing (airline group, online shop, etc). We believe that in this case, to enhance the user experience, it is often possible, and desirable from a business point of view, that the Service Provider itself supports these access fees on behalf of the user, typically as an added value to its own service. This would give the Service Provider a marketing advantage, by presenting a unified view to the user on the service being accessed. That is, instead of having the procedure of establishing a connection with the Network Provider to then access the service, the user instead accesses the service "directly", creating the notion that the service is available anywhere. It also works as an enabler for both the Service and Network Provider, since the usual usability barriers are reduced and users' have fewer concerns accessing the network since they are not providing their personal data directly to the NP.

BRIEF DESCRIPTION OF THE DRAWING FIGURES

There are several ways how to design and further develop the teaching of the present invention in an advantageous way. To this end, it is to be referred to the following explanation of preferred examples of embodiments of the invention illustrated by the drawings. In connection with the explanation of the preferred examples of embodiments of the invention by the aid of the drawings, generally preferred embodiments and further developments of the teaching will be explained.

In the drawings

Figure 2:
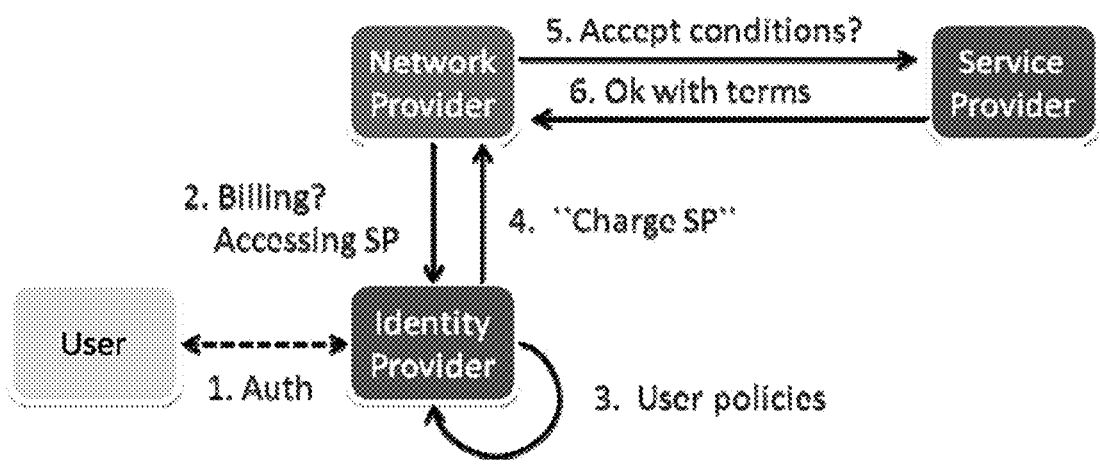
Figure 3:
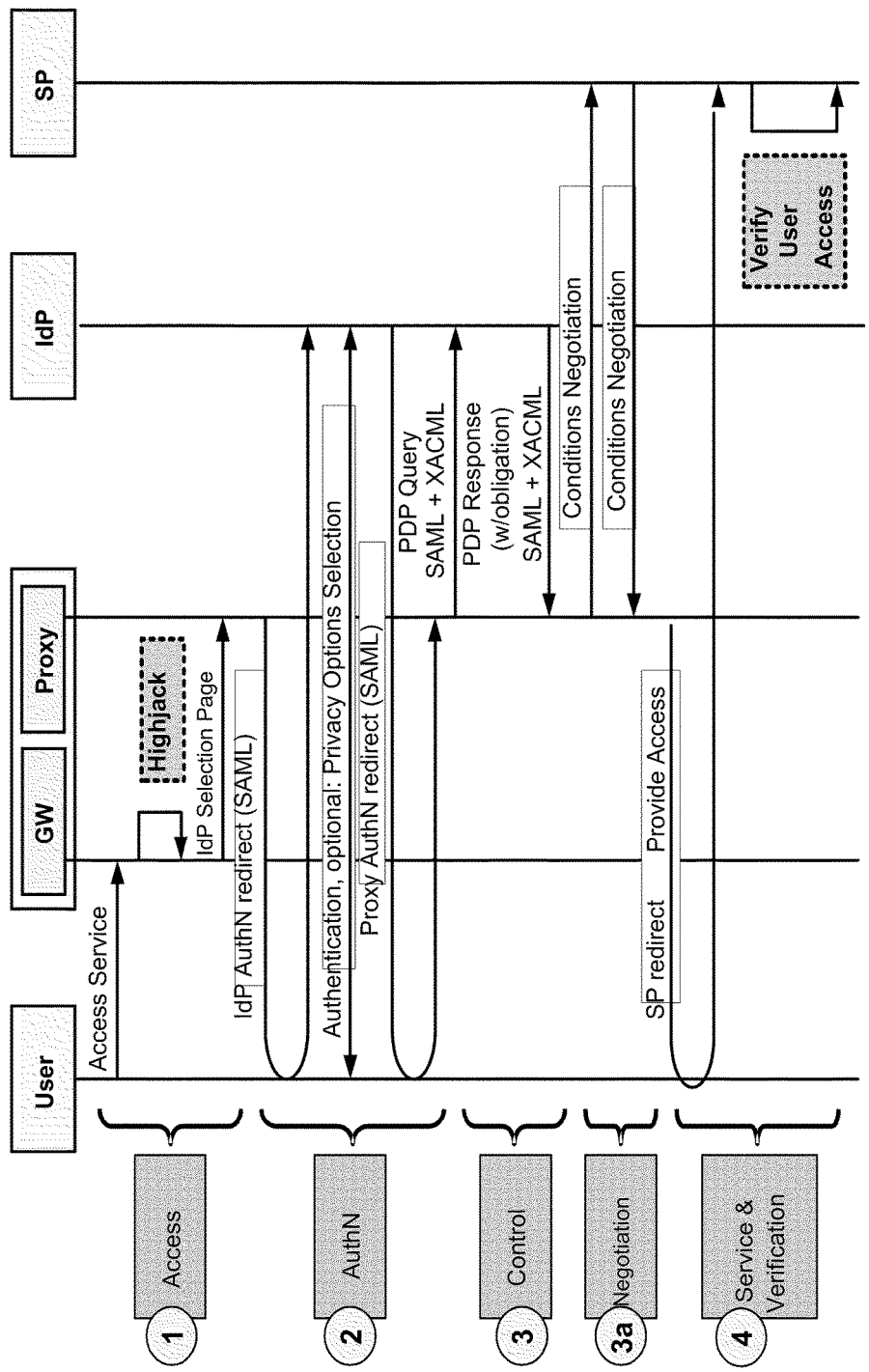
Figure 7:
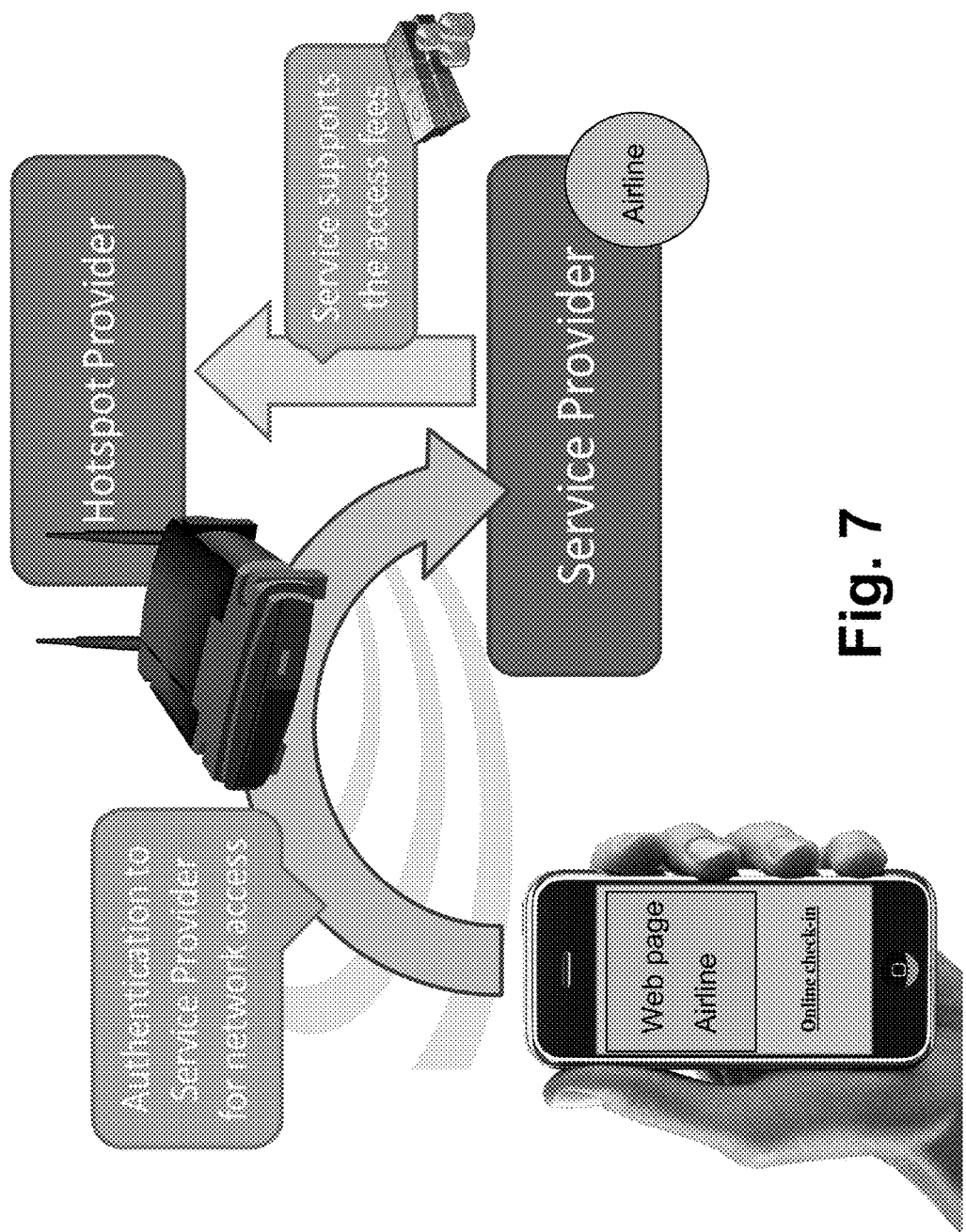
Figure 8:
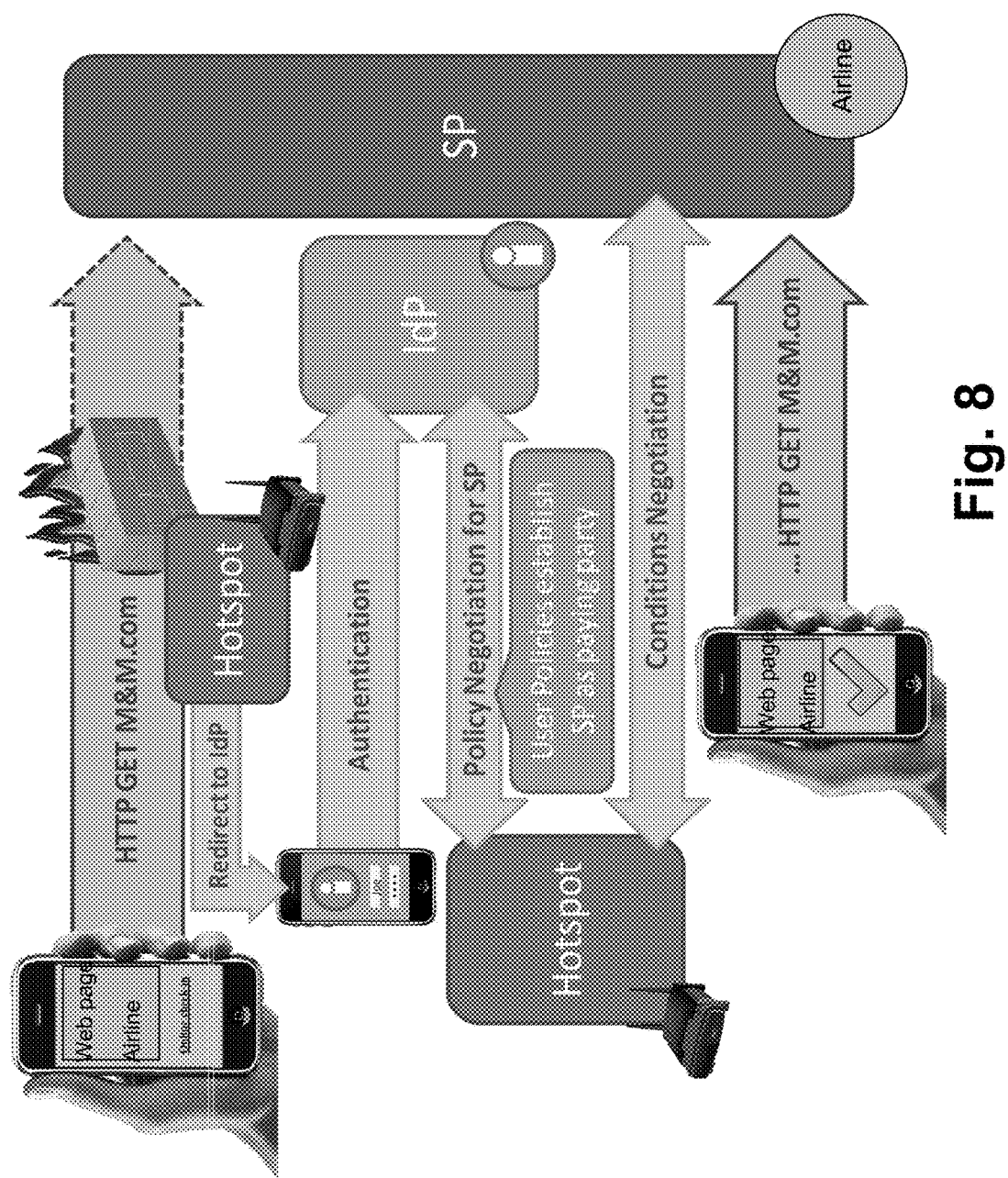
Figure 9:
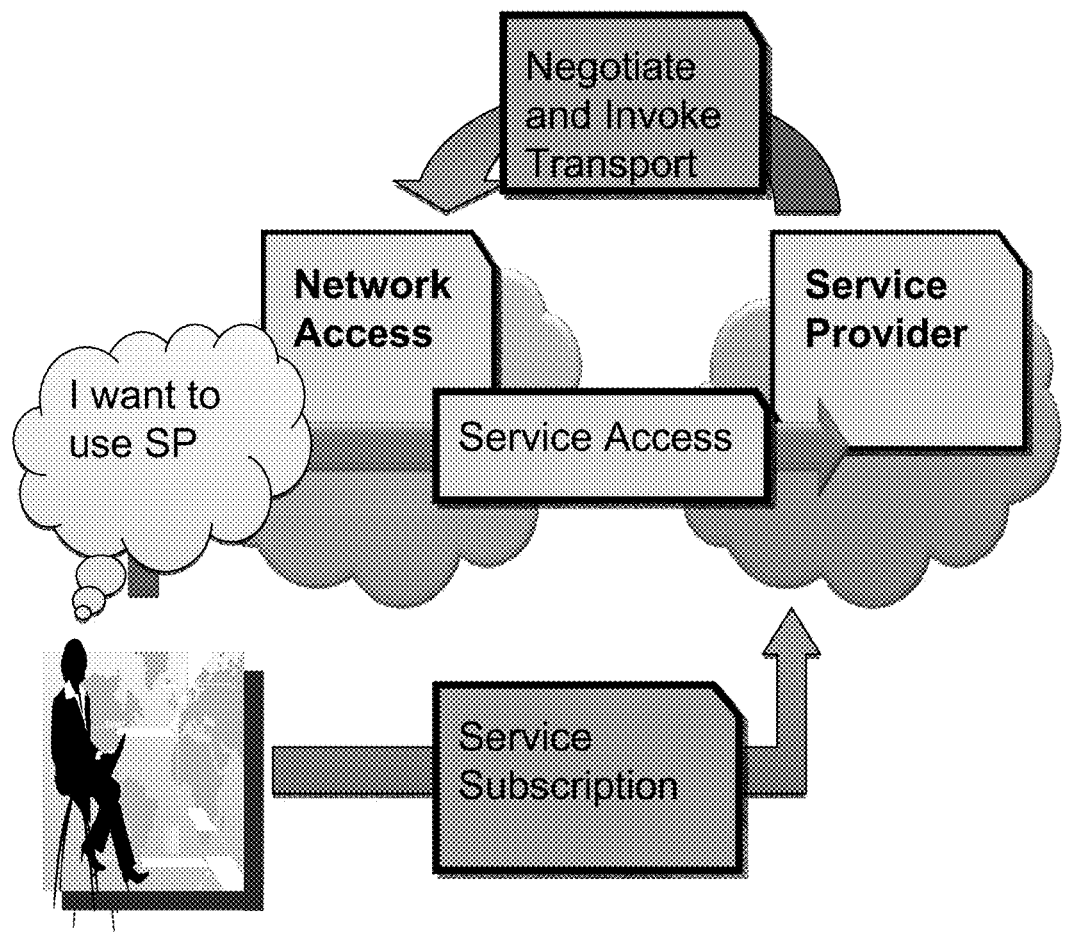

FIG. 1 is illustrating existing network access, which involves authentication to the Identity Provider, followed by obtaining billing information and finally accessing the Service Provider, FIG. 2 illustrates an establishment of service-bound billing, in which the Identity Provider is able to establish a third party as a charging party from context, FIG. 3 is illustrating a process for providing network access according to an embodiment of the present invention, FIGS. 4 to 6 are illustrating important parts of a process according to an embodiment of the present invention, FIG. 7 is illustrating the basis process according to an embodiment of the present invention, FIG. 8 is illustrating a more detailed process according to an embodiment of the present invention and FIG. 9 is illustrating a further embodiment of the present invention.

DETAILED DESCRIPTION OF THE INVENTION

FIG. 1 is illustrating an existing network access, which involves authentication to the Identity Provider (IdP), followed by obtaining billing information and finally accessing the Service Provider (SP).

Within FIG. 1 one trivial extension to the existing network access, such as that provided in hotspots, would be that, as part of the user's initial attachment to the network, he authenticates itself to the Identity Provider so the Network Provider (NP) may obtain sufficient billing information to charge the access. This information may either be whether the user has an active subscription with the network provider or banking information that the network provider may use to bill the user (credit card number, bank account, etc). This model is built on the intent of the user to access the network, which is a dependency on accessing the service.

This model forces the user to perform an additional transaction, potentially establishing a contract, with the NP. This means that besides personal information required for this transaction, the user might need to expose as well his banking details (credit card number) to the NP in order to be charged.

FIG. 2 illustrates an establishment of service-bound billing, in which the Identity Provider is able to establish a third party as a charging party from context.

The present invention is meant to augment the previous type of access in two points:

Preserving the context of the user's action. The original intent (accessing the Service Provider) is inserted into the policy building process. It is also assumed that additional context information could be added by the NP, such as location. The identity of the NP is already derived from the communication between NP and IdP.

Instead of obtaining billing information from the Identity Provider to charge the user directly, the Network Provider produces an obligation which contains billing information.

By having this query to the Identity Provider IdP, the IdP can provide the billing information based on the context built by the NP, the user's policies, the identity of the Service Provider being accessed, etc.

In order to support an iterative deployment strategy, where an NP does not support all of the mechanisms here defined, we allow the IdP to infer the capabilities of the NP, in this case, whether it supports the off-loading of charging to a third party.

If the NP does not support this capability, then this model may still be deployed by introducing a new function which provides the brokerage between NP and SP. It is not the goal of this document to define such a broker, but in principle this broker could obtain information from the SP regarding billing limits, which could be simple such as amount of money/time, or more complex (based on usage patterns) and provide the NP with the required banking information it needs to charge, such as a credit card number.

On the other hand, a fully compliant NP is able to receive the identity of who should be charged for the access together with some user limits on this information. One of the possibilities is that the billing information has a pre-defined application validity, such as maximum data bulk amount or a time limit, and the user himself might want to limit how much he spends on each access, as to mitigate bad behaving applications, or similar situations. The charging and billing mechanisms can be enhanced with privacy protocols to protect the user's identity from the NP.

Through the Identity management framework, the NP is able to establish a connection with the billing party (most cases the SP being accessed) to validate and/or negotiate the information that was provided by the IdP.

The concept can be further extended to provide generalized roaming support, wherein the Service Provider (SP) being accessed is the Home Network Provider (HNP) of the user. In this case, the HNP will support the billing with the Visited Network Provider, and will then proceed to bill the user as is done with traditional roaming. However, adopting this concept allows highly dynamic roaming federation to occur, where no pre-established agreements exist between Visited and Home Network Providers, offloading that capacity to the generic Condition Negotiation herein presented.

Four use cases that support the concept are presented in the following:

Online Check-in (Frequent Flyer)

While in a foreign country, John Doe is taking his breakfast in a local coffee shop. Luckily for him, a local telco offers a wifi hot-spot service. Having his returning flight in the afternoon, he takes the opportunity to do the online check-in at this time. As a member of the frequent flyer program of the airline group he is travelling with, he authenticates using these credentials. One of the benefits of being a frequent flyer includes the paying of network access to obtain flight times and doing the online check-in. As such, the airline company IdP provides credentials and a billing obligation to the Network Provider which includes the airline company as payor. The user is able to complete the online check-in using his mobile phone.

Company VPN Access

A company could provide for its employees the ability to pay their access fees to the company VPN service. Using the same mechanisms, the user would authenticate to his company's IdP, who would then provide the necessary credentials and a billing obligation to the network provider whenever the user is establishing a connection to the VPN. This mechanism could be further augmented if the mobile terminal has a strong digital identity (such as through TPM) and thus this service could be available through authentication of the company's hardware as well.

Amazon®, Online Shopping

To increase their sales volume, Amazon® could work as an enabler of Internet access by offering to cover the network access expenses whenever a client performs a buy of a certain value. Additionally, for previous clients, it could offer a fixed period of time that users could use to browse the store, based on the client's buying history. This offer would be limited, with the user supporting the access fees whenever Amazon® wouldn't, either based on time or other. This deployment would make use of dynamic negotiation between the Network Provider and the Service Provider (Amazon®) that establishes maximum duration and cost based on user profile. By using a standard means of authentication and negotiation, using Amazon® as Identity Provider, and adding Amazon®'s own web services such as Amazon®'s "Flexible Payments Service", a deployment would be possible using current technology.

Netflix®, On-Demand Video Service

Netflix® allows its users to rent movies, or the latest episode of their favorite TV series, and stream the content to their devices so they can see the video in the comfort of their home or wherever they can access their Netflix® account. However, due to high bandwidth requirements, this service is not suitable for mobile networks such as UMTS. The reasons are both technical, the characteristics of the medium, and economical, if flat rate is not available. At the same time, hotspots have especially permeated leisure areas in hotels (including the hotel room), airports, train stations, cafes, etc where the user is meant to spend some time. To access these services, the user would normally have to pay an expensive fee for hotspot access, on top of the Netflix® subscription. This use case allows our user, a tired business man on a trip to a customer meeting, to catch up with his favorite soap opera in the bar of the hotel and watch a movie before going to sleep in his room. This is all part of his Netflix® subscription: he gets access to the content in whatever hotspot he connects to without worrying about the complicated and expensive subscription at that hotspot. Also, the interface will be personalized to him so that, no matter the hotspot or location, the interface is the one he is used to, provided by the SP. Netflix® will, in the background, cover transport costs towards the NP, like in the previous use cases, and provide its users with a more comprehensive list of subscription classes.

FIG. 3 is illustrating an embodiment of a process for providing network access for a user via a Network Provider (NP) to a Service Provider (SP). In this example, and without loss of generality, we will focus on the use case of the frequent flyer. To recall, this example involves the use of a common wifi hot-spot for accessing a web service available through an http server.

We can split the procedure around service access into three distinct parts: Authentication, Access Control and Conditions Negotiation.

We'll assume the user's terminal is ready to be used and the network access has been configured to use the open hot-spot (this could have been done automatically by the terminal's support software). A more complicated discovery mechanism, even with the aid of the Identity Provider, could also be part of this setup phase.

(1) User Tries to Access http://airline.com

The user opens his browser and tries to open the airline company's website (in this example, http://airline.com). An HTTP connection is established with the service; however the hot-spot uses a transparent proxy to where all of the HTTP connections are redirected through a policy rule in the gateway. This process is similar to the existing hot-spot technology.

(2) Authentication Required

As the user is not currently authenticated, the proxy redirects the user to a page where he can specify his Identity Provider. We assume the hot-spot gateway can establish whether the user has been authenticated or not based on its session with that particular user. At the page of the NP, the user specifies his Airline/Frequent Flyer Identity Provider. The user will then be redirected to the frequent flyer program login page.

Alternatively, the user can specify a third party Identity Provider who knows about his Frequent Flyer Identity.

(3) Authentication and Privacy Options Selection

The user enters his authentication credentials at the Identity Provider and specifies any extra privacy options. These could be used to limit the amount of information the Network Provider has access to, including whether the Condition Negotiation is done by the Identity Provider or by the Network Provider. For this example, the user has not specified any extra privacy options.

(4) Access Control

After obtaining an authentication context that identifies the user, the proxy can query the user's IdP for information. The proxy will query the IdP in order to establish the policy that will be enforced by itself. In this query the Network Provider will supply the original context, which includes the service (in this case HTTP) and URL the user were trying to reach. The information obtained as a PDP (Policy Decision Point) response from the IdP will include the obligation information that will allow the proxy to establish who will be the paying party and also any restrictions to the access authorization (e.g. only communication to that frequent flyer domain is allowed). In order to establish who will pay for this network access, the Identity Provider will follow the following steps:

Verifies whether the URL the user is accessing is one covered by the frequent flyer program.

Checks the Network Provider's identity for a known trust chain. Very much as a user, the airline company must be sure the Network Provider is trustable and a valid handler for the user's data.

When both steps are positively processed by the IdP, it replies to the Network Provider with the identity of the airline financial branch as the payor of this communication.

(5) Policy Decision Check

Receiving the reply, the Network Provider will itself verify whether the information is compatible with current established policies, as well as with the levels of trust it has configured (in particular, whether it is willing to trust the payor of this transaction). It reads the identity of the airline financial branch as the payor, and verifies that it is backed by a major credit company to which it has an agreement with (here, it could be the Network Provider's financial banking itself to have an agreement with the other peer's but the trust behind the billing process is not central to the procedure being described).

(6) Conditions Negotiation

The Network provider will now inform the airline financial branch of his expected fees, which is followed by negotiations by both parties in order to agree on the amount being paid and when. There are several possibilities here, including the pre-establishment of conditions between both parties which allow a simplified handling of the billing and reduced costs for the Service Provider. It is also envisioned that this negotiation and billing can be done through a third-party billing broker that maintains information about costs of different countries, currencies, etc. Part of the response provided by the SP (in this case being brokered by the financial branch of the airline company) should include limits and possibly maximum time of communication, maximum bulk of data and maximum amount of money paid.

(7) Service Access

Finally the user is able to access the airline's website.

For better understanding of the illustrated embodiment the single steps are again summarized in the following:

(1) Access to Service and Highjack

User connects to SP, http is highjacked (like hotspots).

(2) Identity Provider Authentication

User is redirected to IdP for authentication.

(3) Access Control to Service Access
   Transport or Network Provider verifies access conditions with IdP.
(3a) Optional: Conditions Negotiation
   Transport or Network Provider verifies billing options and fine tunes access conditions with SP.
(4) Access to the service and access verification
   Optional: SP can check if user has ever accessed the service under NP's service access conditions.

In the following a further detailed explanation of an embodiment of a process according to the invention is formulated:

1) Access to Service and Highjack

The technology used in this step is well known. At first we highjack the http connection using a transparent proxy, like it is done in many hotspots. Then the user will be presented with the hotspot webpage and either the user presents his IdP information or it is automatically retrieved and the user is redirected to the IdP.

2) Identity Provider Authentication

Again, in this step, the technology is well known. The IdP challenge the user's authenticity by requesting information that only the user has, e.g. login and password or SIM card authentication.

3) Access Control to Service Access

Knowing the user's IdP, the NP can now question in terms of access. The NP will construct a policy decision request, acting as a PEP (Policy Enforcement Point), and contact the IdP which will act as a PDP (for an example of an access control framework see OASIS XACML, available at http://www.oasis-open.org/committees/xacml/). This request will contain context information which will allow the PDP to reach a decision. The IdP may also enforce proof that the NP has the user, such as the assertion obtained in step 2). After processing the request, the IdP will provide a policy decision which includes an obligation as described below. This obligation may contain information about the payment and negotiation phase of the protocol. If the NP is satisfied with all the information in this request, then step 4) can be skipped.

The described example obligation, which is part of the response from the IdP, contains information on how the negotiation phase can begin (which subject can be used to address the user and the SP endpoint), information about payment—here how much the SP is willing to pay—(one-time payment, rating, price, billing information) and which restrictions should be enforced for the service for that rate.

This obligation example has been simplified to be easier to read and will not pass the schema definition. Data values of attributes must be serialized.

4) Conditions Negotiation

This step will be very much dependent on the SP and NP and there are many different possibilities on how to achieve it.

In this step both the SP and NP can fine-tune the payment and service access options. All of the attributes specified in the previous bullet apply but others can be added such as QoS.

The obligation contained in 3) can provide much less information, requiring a stronger conditions negotiation or, if step 3) is satisfactory, this step can be skipped. It is assumed that the SP and NP will choose the lowest binding for service provisioning since this reduces cost for the SP and resources at NP.

In the described example, NP and SP will both provide their boundaries for service provisioning in terms of P3P (Platform for Privacy Preferences) policies. These policies are usually used to convey how user data will be manipulated but we extend their use to determine service level parameters. Another reason for choosing P3P is that since this policy is meant to be public, it will also discourage misbehaving NPs and SPs.

As can be seen in the example using P3P, the SP focuses on the filters and billing information (where it can be obtained for authorized parties, not the actual information) and the NP on the payment.

See FIGS. 4 and 5.

After obtaining the policy from the SP, the NP checks if it is compatible with its own policies. If it is the specified access limitations are deployed and the user is allowed to contact the SP. If the SP did not agree with the NP's proposal, after the user reaches its page, it can deny access locally.

It is to be noted that the SP and NP can also negotiate the privacy policies themselves at the same time, although this is outside the scope of this invention.

Other possibilities for this step include proprietary solutions for the negotiation step.

5) Access to the Service and Access Verification

Once all the previous steps have been achieved, the SP can allow payment to the NP once the user has logged in to its website. The login procedure can be based on the previous authentication towards the IdP and will be, in this way, transparent to the user.

See FIG. 6.

In the following an embodiment of the invention is again described in some more detail:

FIG. 3 is illustrating a diagram of an instantiation of the protocol with the messages exchanged. The protocol flow follows the example given above but is generalized and further described in detail in this section.

Standardization is of particular importance in this context as different equipment owned by different operating providers will interact during these exchanges. The SAML specification already defines the required bindings and profile extensions for use with HTTP. Extensions for SIP to provide the same capabilities have been presented to the IETF [SIP SAML]. Other transports might require specific extensions to be standardized.

Service Access

Access to the service is performed using the service specific protocol. While in most cases this will be over HTTP, such as the examples portrayed above, other services, like SIP based services, as to support roaming, are not excluded. The system will greatly depend on the support from the Identity Provider for other service protocols. However, SAML binding and profile extensions required to use with other services (other than HTTP), continue to be introduced, such as [SIP SAML] for SIP.

For Service Access, we assume the message herein processed is the first message of the service protocol being used. In the case of HTTP, this message would be an HTTP GET, in SIP it could be a SIP REGISTER message, and so on.

Interception and Processing of the Service Access Message

Since this step is also outside the scope of this description, we do not mandate the mechanisms by which the Network Provider learns the user's IdP. However, below are two proposals based on existing technology and new standardization efforts, one for the HTTP case and another for the SIP case.

Like in most hotspots, the service access message is intercepted by the Network Provider to offer the user a number of alternatives to pay for service access. We propose the Network Provider include an option to identify the user's Identity Provider. In HTTP this would translate to the user being redirected to a webpage where he can fill out a form which indicates to the Network Provider who his IdP is. In SIP, the same function could be provided by a special header inserted by the SIP UA upon failure to connect, or a priori if the application can detect the lack of internet access. A more detailed explanation on the use of this special SIP header can be found in the [SIP SAML] IETF draft.

For other types of service transport, appropriate mechanisms to inform the NP of the user's IdP must be introduced.

IdP Authentication Redirect

From now on we will refer to the generic case where we no longer specify whether HTTP, SIP or other protocols are used. In fact, the messages exchanged are independent of HTTP or SIP, or any other transport protocol. We refer the reader to the [SAML] specification or to the [SIP SAML] draft for details on how to apply these protocols for these two bindings. If the service is of a different kind, an appropriate SAML profile and binding must be investigated. Once the binding and profile exist, the following description applies.

Once the NP knows the user's IdP, it can begin the authentication query procedure. The NP creates a SAML Authentication Request message and embeds it into a message to the IdP. In many profiles, this translates into a redirection message which the user is responsible for handling; the NP redirects the user to the IdP carrying his Authentication Request.

Authentication and Optional Privacy Options Selection

Just like in the normal SAML model, the user will have to authenticate towards the IdP, if there is no authentication context already present at the IdP. The actual method is not defined but could be, for example, using login and password or challenge-response using a certificate.

Also in this step, the user can select his privacy options if available. These might impact the service quality or even access to the service. The purpose of this step is to facilitate privacy extensions where the user may choose not to provide parts of his context to the Identity Provider as part of the Access Control process.

The context information in question may include the user's device information, the location of the device, the network operator local information, the service being accessed as well as many others.

The IdP can act as an auditing tool to observe if the NP abides to the user's policies.

Proxy Authentication Redirect (Authentication Response)

Once the user has been authenticated, the SAML model dictates that the IdP should now redirect the user back to the NP. The information contained in this SAML message refers to the Authentication Context as well as the privacy options the user has chosen.

Since the privacy options are not currently standardized as part of SAML, we consider them as attributes of users. We can embed them in the SAML message as a typical attribute assertion.

The privacy policies themselves can be specified in many ways. For simplicity, we assume the use of W3C P3P [P3P] which is a simple mechanism to describe disclosure and processing of information.

When the message is received, the proxy will verify the signatures in the Assertions in the SAML Authentication Response message and whether the authentication method in the Authentication Context is acceptable. Then it will verify the P3P policies and whether these are acceptable to the NP.

If the NP believes this is not enough for the Access Control part, it will go back to the Authentication step, forcing re-authentication but embedding its own P3P policy proposal in the Authentication Request. Everything else should continue up to this point except that the user should be informed of NP's expectations in terms of privacy policy.

Once the privacy policies adhere to both the user and NP's requirements, the processing of the user's access to the service can continue.

Policy Decision Query

In order to allow access the network, the NP will have to confirm with the IdP that the user has the correct authorization, or payment method. In this step we make use of [XACML] which is a generic access control framework. The choice of XACML was due to its long relation to SAML. SAML and XACML together provide the transport of XACML Policy Decision Queries as well as Policy Decision Responses, the specification and processing of the policy decision.

The XACML Policy Decision Query contains the context under which the policy should be evaluated as well as some variables which can be instantiated only at the Policy Decision Point (PDP), in our case, the IdP.

Example of context information could be:
Information about the service the user is trying to access
Location of the user, as given by the user or NP
Information on the user's device/application
Etc. . . .

As to the variables in the Policy request:
User's attributes such as: age, gender, preferences, etc
Time, date, region/timezone
Information on billing provider
    List of preferred
    Name, association, group, etc
    Country
    Financial data
Etc. . . .

When the PDP (IdP) receives this message, it will process it according to its internal policies. These policies may include information on how to bind the access context to user attributes such as subscriptions, billing providers and preferences. The response will be built in accordance to these policies which may include extra information in the decision, such as XACML obligations. The decision must be sufficient for the NP to ACCEPT, NEGOTIATE or REJECT the access request. The message is signed by the NP.

Billing Obligation Definition

In this section we propose a specification which includes billing information and parameterization inside an XACML policy decision response. This obligation can include either data, like a SAML assertion, or a pointer to the information, such as a SAML artifact, which must be resolved before the policy is enforced.

The information contained in this assertion:
Must include billing provider negotiation pointer (including protocol)
Or
Must include direct billing information (i.e. credit card details, etc)
The information must be asserted by the billing provider or another suitable accredited source
May include information about the provider
    Name, address, etc
    Affiliation, Group, etc (e.g. credit card, Paypal®, bank, operator, . . . )

Accreditation
May include maximum risk factor (like maximum payment)
Policy Decision Response
The Policy Enforcement Point (PEP), in our case the NP, receives a decision from the IdP. Once again, this decision message must be processed according to SAML XACML, this includes signature verification.

Should the answer include a positive answer, either ACCEPT or NEGOTIATE, the NP must check whether an obligations section exists. The NP can now run its own policy engine on the obligations of the decision to see whether this is satisfactory. If at this point the decision is to continue processing the service access, then conditions negotiation for the access might be necessary.

Conditions Negotiations

The NP can now prepare a P3P policy which details what information is required for the billing of the network access service as well as some other parameters which may include:
Price per unit, session, agreement
Risk management
  Maximum transferred data before payment
  Minimum allowed payment
  Initial down payment
Agreement information, in case of contract between SP and NP or to setup a new federation
Limitations on the service
  Time, bandwidth, service, etc The user's authentication assertion received from the IdP may also be included in the initial negotiations message to prove user's and IdP's involvement in the process. This parameter might also be requested in a P3P policy by the SP.

These parameters are exchanged together with the P3P policy with the SP who, in turn, will propose its own values, and may offer some other parameters, until an agreement is achieved.

If an agreement cannot be achieved, ex. two consecutive exchanges where nothing is changed, the service cannot be reached in this way and a proposal may be offered to the user (i.e. user must pay on his own).

Otherwise, the process continues to the next step.
Service Provider Redirect (Authorized Service Access)

Once the NP is assured of payment, it redirects the user to the SP. This might require a new call to the IdP if the SP requires authentication, but the SSO of the system should allow this to happen without user interaction.

The user accesses the service.
Service Provider Agreement Validation

Optionally, once negotiations are concluded or by trigger of the IdP, the SP creates an entry which details which user and conditions for access service provisioning with a NO SHOW statement. This entry can be associated with a timer which marks this entry with a FAILED statement if the user does not access the service after a certain time.

Once the user accesses the SP for first time, the SP can tag this entry with COMSUMED. Optionally it might want to store the authentication assertion it received from the IdP on user login to the SP to prove to the user that the service was indeed consumed in this way. This step is useful if the user will be credited by the SP for using the service in this way. The third scenario, roaming, is a typical use case where this happens.

When the NP bills the SP, the SP can check the status of the entry to contest charging.

The implementation of this section of the system depends on the SPs risk management mechanisms.

Important features of an embodiment of the present invention are illustrated in FIG. 7:
  User accesses the service, authenticates to Identity Provider (IdP) via redirection by the Hotspot Provider
  User Policies establish the SP as the paying party, when queried by the Hotspot Provider
  Negotiation between Service Provider and Hotspot Provider establishes the billing details Further details and benefits are illustrated in FIG. 8:
  User picks Service Provider's (SP's) bookmark and selects nearby Hotspot (could be automatic)
  IdP knows SP's identity through the Hotspot's policy query
  IdP knows the user has a subscription with the SP
  SP is charged for the user's network access based on policies supplied by the IdP.
  Concept benefits:
    Profit: Hotspot is accessed by more customers
    Increase customer base: SP gains more users; value-added service
    Trust: Users get a consistent, simple view of the service
  Animated steps are illustrated in FIG. 9.

In the following important aspect of the present invention are summarized:
  New combination of identity management and access control technology to allow for third party payment of network transport.
  Extend the authentication phase to include privacy options for the user.
  New application of P3P policies to negotiate access conditions between NP and SP.
  Network provider can bill service provider on service access during user authentication.
  User can select privacy policies on access control protocol.
  Network provider and service provider can negotiate conditions for network access independent of the identity management system.
  Based on new business model.

Advantages of Invention compared to current state of the art:

In regards to US 2004/0203602 A1, US 2004/0152447, as well as U.S. Pat. No. 6,862,444 B2, the present invention augments these mechanisms to offload both the authentication and the establishment of the paying party to the Identity Provider, by doing so, effectively allowing per-service policies to be established based on pre-configured knowledge stored in the Id Broker. The network provider is able to bill service providers for the network access, establishing the identity of the paying party during user authentication, and thus preserving the privacy of the user, which will not disclose any personal data to the NP. The current model only allows the user to leverage its own separate contracts or subscriptions with the network provider and service provider individually.

Additionally, no pre-agreements (SLAs) or any other knowledge between providers is required besides a common understanding of billing mechanisms. Mechanisms such as those described in US 2005/0210288 A1 only allow for a limited amount of services to be accessed, wherein the hotspot provider is aware, via prior agreement, of a special kind of authentication as well as the available services to the user. This invention does not impose any such limitation.

Current practices, such as those described U.S. Pat. No. 6,266,401 B1 and U.S. Pat. No. 6,721,554 B2, are further extended by not building any specific service support into the system, allowing any potential exchange to occur, built into current and future billing methods, besides those presented by the authors. Specifically, the protocols used by this invention allow new kind of obligations between NPs and SPs to be defined, built on dynamic policy building.

The invention depends to some extent on an Identity Management system to be established to provide a link to the user's identity and later to the billing provider. This is still not a strong requirement since the role can be played by the SP or any other third party; depending on service agreements.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A process for providing network access, comprising:
   entering, by a user, an area of coverage of a wi-fi hot spot;
   the user utilizing the hot spot by opening a browser of a portable electronic device of the user to a service to be accessed;
   prior to the user being authenticated and based on a user's request to access a Service Provider, establishing a HTTP connection between the user's portable electronic device and a gateway of a network of the Network Provider;
   authenticating the user by a proxy of the gateway redirecting the user to a location of a user's Identity Provider;
   after the proxy receives, upon the authenticating being successful to authenticate the user, an authentication context that identifies the user, the proxy constructing and sending a policy decision request to the Identity Provider to obtain Policy Decision Point data from the Identity Provider;
   transmitting the Policy Decision Point data from the Identity Provider to the proxy, the Policy Decision Point data providing the Network Provider, via the proxy, information that the Service Provider or a third party is payor of access fees for the authenticated user;
   after receipt of the Policy Decision Point data at the proxy, the proxy negotiating with the Service Provider how much the Service Provider is willing to pay as the access fees for the authenticated user, and network service access obligations the Network Provider will meet in providing the authenticated user access over a HTTP connection to the Service Provider, the network service access obligations including service level parameters;
   as a result of the negotiating, the Service Provider providing the proxy with a policy specifying how much the Service Provider is willing to pay and the network service access obligations the Network Provider will meet;
   the proxy producing, from the policy provided by the Service Provider after the negotiating step, an obligation containing billing information sufficient for the Network Provider to subsequently bill the access fees to the payor;
   the Network Provider providing the access for the authenticated user to the Service Provider; and
   presenting a unified view, on the browser of the portable electronic device, of the service being accessed.

2. The process according to claim 1, further comprising:
   the Network Provider using the obligation produced in the producing step from the policy provided by the Service Provider to charge the access fees to the payor.

3. The process according to claim 1, wherein the obligation is in eXtensible Access Control Markup Language.

4. The process according to claim 1, wherein the Identity Provider is the Service Provider.

5. The process according to claim 1, wherein, in said authenticating step, the proxy redirects the user to a page where the user can specify the user's Identity Provider.

6. The process according to claim 1, wherein the data being transmitted from the Identity Provider to the Network Provider are based on at least one of context built by the Network Provider, the user's policies or the identity of the Service Provider being accessed.

7. The process according to claim 1, further comprising:
   negotiating, by the Network Provider and the Identity Provider, to select the payor.

8. The process according to claim 7, further comprising:
   selecting the payor based on context and/or user policies.

9. The process according to claim 1, further comprising:
   redirecting the user, by the Identity Provider, to the Network Provider after authentication.

10. The process according to claim 1, further comprising:
    negotiating and/or verifying, by the Network provider, billing obligations or information provided by the Identity Provider with the payor.

11. The process according to claim 1, further comprising:
    as part of establishing the network service access obligations, providing boundaries of the Network Provider and the payor or Service Provider for service provisioning in terms of Platform for Privacy Preferences Project policies.

12. The process according to claim 11, further comprising:
    utilizing the Platform for Privacy Preferences Project policies to determine service level parameters and/or to negotiate access conditions.

13. The process according to claim 1, further comprising:
    selecting, by the payor or Service Provider, filters and billing information; and
    selecting payment by the Network Provider.

14. The process according to claim 1, further comprising:
    offering other personal or individual information about the user to at least one of the Network Provider or Service Provider to enhance personalization or for providing information required by the Service Provider or Network Provider.

15. The process according to claim 1, further comprising:
    providing, by the Network Provider, a WLAN for network access.

* * * * *